Patented July 18, 1933

1,919,023

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

PURIFICATION OF BENZOIC ACID AND ITS DERIVATIVES

No Drawing. Application filed April 4, 1929. Serial No. 352,611.

This invention relates to the purification of benzoic acid and its derivatives and more particularly to their separation from the corresponding phthalic acids.

Benzoic acid and its derivatives, such as the amino-, nitro-, chlor- and brombenzoic acids may be prepared by various processes from the corresponding phthalic anhydrides or phthalic acid and salts, for example by heating an aqueous solution under pressure with or without a catalyst and/or the presence of reducing gases, vapor phase catalytic reaction in the presence of steam with or without reducing gases, heating salts in the solid or pasty phase, vapor phase reactions in the presence of electric discharges with or without reducing gases, etc. The product obtained ordinarily contains both benzoic acid and unchanged phthalic acid in varying amounts. The separation of these two products presents considerable technical difficulty.

The standard method which was used in the past consists in preparing a water solution of the two acids and then removing the benzoic acid by solvents such as ether, chloroform, and the like. As large amounts of solution have to be handled, this method, although giving a reasonably good separation, is too expensive for practical use.

In my prior Patent No. 1,685,634 dated September 25, 1928, I have described and claimed a method of separating benzoic acid from phthalic acid in aqueous solution by countercurrent flow of solvent for benzoic acid which does not mix with water and this process can be commercially used especially where the benzoic acid and phthalic acids are obtained normally in the form of a water solution or suspension. Where, however, they are obtained in the form of a mixture of solids, either dry or only containing relatively small amounts of water, it is necessary first to dissolve them up in water, a tedious process necessitating large apparatus because of the low solubility of the acids.

The present invention eliminates this disadvantage and is based on the discovery that, contrary to the teachings of the past, it is not necessary to dissolve the acids in water in order to obtain a clean separation by means of a solvent for benzoic acid and, on the contrary, the benzoic acid can be washed out from the corresponding phthalic acid by means of a solvent such as chloroform; aromatic hydrocarbons, for instance benzol, toluol, solvent naphtha, carbon tetrachloride; chlorinated hydrocarbons, such as for example, trichlorethylene, tetrachlorethane; and some of the chlorinated residues or sludges produced as a by-product from the purification of aromatic hydrocarbons by selective halogenation and described in my prior Patent No. 1,741,305 dated December 31, 1929 and co-pending application Serial No. 101,561 filed April 12, 1926; ether; paraffin hydrocarbons; esters; and other well known organic solvents of similar character. Even when the solid mixture is substantially dry or contains but very little water, a satisfactorily clean separation may be obtained as the phthalic acid, contrary to the belief in the past, is not sufficiently soluble either in the solvent or in the benzoic acid to be washed out in quantities sufficient to cause any trouble.

The washing or leaching process of the present invention produces a clean-cut separation in apparatus of small dimensions without the necessity of treating an enormous quantity of water as in the processes used in the past, and a great increase in speed is obtained as the process is ideally suited for rapid filtration or washing such as is possible in a centrifuge. A solution of benzoic acid is obtained from which the solvent can be readily evaporated and when a suitable solvent such as aromatic hydrocarbon or the like is chosen an azeotropic mixture is formed with any small amounts of water present and a perfectly dry benzoic acid is obtained which for some purposes does not even need to be sublimed, an important technical economy. The phthalic acid also is obtained as a dry product and not in the form of a relatively dilute solution, and can be readily utilized either to produce more benzoic acid or for any other desired purpose. A great saving in fuel cost, apparatus cost, and losses of material is to be noted over the processes used in the past and the products are obtained in a most satisfactory form with a minimum of difficulty.

Further advantage of the present invention lies in the fact that it can be carried out with the material in a substantially dry state which greatly decreases the corrosion problem for an aqueous solution of phthalic acid is quite corrosive to some metals such as iron and necessitates either the use of special apparatus or results in a high depreciation.

The washing may take place in any suitable manner, but I have found that it is desirable in most cases to use a centrifuge which gives a very rapid separation with apparatus of small dimensions. The mixture of phthalic acids and benzoic acids may be placed in a centrifuge, the centrifuge started and a solvent such as benzol permitted to flow in, or, especially where the mixed product is obtained in the form of comparatively dry solid by catalytic or other processes, it is desirable to mix it with sufficient solvent to form a paste or slurry sufficiently thin to be readily handled. In this manner the centrifuge operates more rapidly as the solvent is intimately mixed with the product before the washing commences. Additional solvent is, of course, run in to the center of the centrifuge until the filtrate is substantially free from benzoic acid.

A single solvent may be used or in some cases it may be desirable to use either a mixture of solvents or a succession of solvents. Thus, for example, where it is desired to make a paste of the crude product for ease in handling this may be made with a suitable non-inflammable solvent such as carbon tetrachloride, the paste placed in a closed centrifuge, centrifuged until substantially dry, and then further washed with inflammable solvent such as benzol, ether, or the like, thus eliminating all fire hazard in transferring the paste to the centrifuge while permitting the use of highly inflammable solvents where these are desirable.

The washing or filtration may be at ordinary room temperature or, if desired, may be at suitable elevated temperature, but care should be taken that the temperature is not sufficiently high so that phthalic acid is dissolved. This will vary, of course, with the different solvents and in no case should the temperature exceed 191° C. as above this temperature the phthalic acid is transformed into phthalic anhydride, which is quite soluble in most of the organic solvents for benzoic acid.

Instead of a centrifuge an ordinary filter press or nutsch filter may be used but the process is less rapid and for most purposes it is desirable to use the more efficient and more rapid type of apparatus. Continuous filters, such as for example, those of the Oliver type may also be used, and present some advantages as the process is then a continuous one instead of a batch process. On the other hand the use of filters of this type necessitates the thorough mixture of the crude material with the benzoic acid solvent and very slow operation in order to assure complete removal of the benzoic acid. In most cases, therefore, a centrifuge although necessitating a batch process will be found to present technical advantages by reason of the rapid and complete separation it permits and also by reason of the fact that mixtures of phthalic and benzoic acids of fluctuating benzoic acid content can be handled effectively which presents some difficulty in a continuous filter. The invention is, therefore, not limited to the use of any particular filter or filter type and the chemical engineer will choose the type best suited for the particular installation and for the particular characteristics of the phthalic and benzoic acid mixture with which he is dealing.

What is claimed as new is:

1. A method of removing benzoic acids from a mixture of benzoic and phthalic acids in which at least part of the acids are present in the solid phase, which comprises washing the mixture with a solvent essentially comprising a hydrocarbon of the benzene series.

2. A method of obtaining dry benzoic acid from a mixture of benzoic and phthalic acids in which at least part of the acids are present in the solid phase and which mixture contains moisture, which comprises washing the mixture with a solvent essentially comprising a hydrocarbon of the benzene series and subjecting the solution to distillation at a temperature which drives off the hydrocarbon and the azeotropic mixture of water and hydrocarbon formed, and continuing the distillation until substantially dry benzoic acid is obtained.

3. A method of separating benzoic and phthalic acids, which comprises forming a substantially dry mixture of the two masses into a paste with a solvent for the particular benzoic acid and subjecting the paste to leaching with a hydrocarbon of the benzene series.

4. A method of removing benzoic acids from a mixture of benzoic and phthalic acids in which at least part of the acids are present in the solid phase, which comprises centrifuging said mixture in the presence of a hydrocarbon of the benzene series.

5. A method of removing benzoic acids from a mixture of benzoic and phthalic acids in which at least part of the acids are present in the solid phase, which comprises washing the mixture with benzol.

6. A method of removing benzoic acids from a mixture of benzoic and phthalic acids in which at least part of the acids are present in the solid phase, which comprises washing the mixture with toluol.

7. A method of removing benzoic acids from a mixture of benzoic and phthalic acids in which at least part of the acids are present in the solid phase, which comprises washing the mixture with solvent naphtha.

ALPHONS O. JAEGER.